US010104733B2

(12) United States Patent
Qiu

(10) Patent No.: US 10,104,733 B2
(45) Date of Patent: Oct. 16, 2018

(54) PORTABLE ILLUMINATION DEVICE

(71) Applicant: Ningbo Futai Electric Limited, Ningbo (CN)

(72) Inventor: Fujun Qiu, Ningbo (CN)

(73) Assignee: NINGBO FUTAI ELECTRIC LIMITED, Ningbo (CN)

( * ) Notice: Subject to any disclaimer, the term of this patent is extended or adjusted under 35 U.S.C. 154(b) by 0 days.

(21) Appl. No.: 15/493,141

(22) Filed: Apr. 21, 2017

(65) Prior Publication Data

US 2017/0311402 A1 Oct. 26, 2017

(51) Int. Cl.

| | |
|---|---|
| ***G06F 3/041*** | (2006.01) |
| ***H05B 33/08*** | (2006.01) |
| ***H05B 37/02*** | (2006.01) |
| *F21V 23/04* | (2006.01) |
| *F21Y 115/10* | (2016.01) |

(52) U.S. Cl.

CPC ..... *H05B 33/0845* (2013.01); *F21V 23/0414* (2013.01); *H05B 37/0272* (2013.01); *F21V 23/0485* (2013.01); *F21Y 2115/10* (2016.08)

(58) Field of Classification Search

CPC .................................................... F21V 23/0485
USPC ................... 315/133; 345/173; 362/202, 276
See application file for complete search history.

(56) References Cited

U.S. PATENT DOCUMENTS

| | | | | |
|---|---|---|---|---|
| 8,344,995 B2 * | 1/2013 | Jeon | G06F 1/1626 | 178/18.01 |
| 8,456,319 B2 * | 6/2013 | Baker | H03K 17/9645 | 340/321 |
| 8,786,548 B2 * | 7/2014 | Oh | H04M 1/22 | 345/158 |
| 2016/0062571 A1 * | 3/2016 | Dascola | G06F 3/0482 | 715/765 |
| 2016/0103609 A1 * | 4/2016 | Hu | H03K 17/9622 | 345/174 |
| 2016/0162112 A1 * | 6/2016 | Lee | G06F 1/1652 | 345/173 |
| 2016/0242251 A1 * | 8/2016 | Newton | F21V 23/0485 | |

* cited by examiner

*Primary Examiner* — Thuy Vinh Tran
(74) *Attorney, Agent, or Firm* — Raymond Chan

(57) ABSTRACT

A portable illumination device includes a light source having a plurality of brightness levels and a touch control system, which is arranged for controlling an illumination of the light source, including a control system and a touch panel operatively connected to the control system, wherein the touch panel is configured for receiving a sliding touch operation, wherein the control system adjusts a current brightness level of the light source into an adjacent brightness level of the plurality of brightness levels in response to the sliding touch operation applied on the touch panel.

4 Claims, 13 Drawing Sheets

A

PORTABLE ILLUMINATION DEVICE

CROSS REFERENCE OF RELATED APPLICATION

This is a non-provisional application that claims the benefit of priority under 35 U.S.C. § 119 to Chinese application number 201610255629.X, filed Apr. 21, 2016, wherein the entire contents of each of which are expressly incorporated herein by reference.

BACKGROUND OF THE PRESENT INVENTION

Field of Invention

This invention relates to the field of illumination devices, and more particular to a portable illumination device and touch control system and touch control method thereof.

Description of Related Arts

Illumination devices have long become an integral part of our daily life. Illumination devices are utilized to illuminate dark environments and serve the function of helping the users to identify the surroundings. Also, illumination devices have a function of reminder. For instance, people may face dark environment during nighttime outdoor activities. If a person carries a portable illumination device, the device can not only help the user to see the road conditions clearly, but also remind the surrounding people about the existence and moving direction of the portable illumination device and its user.

Although nighttime illuminants are everywhere in urban area nowadays, nonetheless there are still occasions that require portable illumination device. For example, it is needed if someone wants to find his lost item at a dark corner, to ride at night, or to jog at night.

A flashlight is a very common type of portable illumination device in our daily life. Flashlights facilitate our daily life very much. Conventional flashlight employs mechanical switch to regulate its brightness and illumination mode. Normally, connection of a mechanical switch is arranged very tight. Correspondingly, the regulation of it requires a relatively great force. This usually brings much uncomfortableness to the user. On the contrary, if this type of mechanical switch is arranged looser, it can be damaged easily and have lower sensitivity. Besides, after repeated operations, this type of mechanical switch will be worn out and the sensitivity of its regulation will be affected in a certain degree. When it gets worn gradually, its life becomes shorter and it can easily be broken.

It usually has to arrange some elements with bulge to set up a mechanical switch, but such elements are likely to be damaged due to impacts. In addition, they also influence the appearance. Moreover, mechanical switch usually requires a movable operation to implement its function. Therefore, the position where the mechanical switch is arranged often contains some gaps that can easily receive and hold dirt, which is not beneficial to keep it clean. After frequent operations, the mechanical switch can easily bring the dirt into the inside of the flashlight, which can therefore affect the performance of the flashlight.

By the development of touch controlling technology, touch controlling technology has been more and more commonly utilized on products like electronic devices due to its advantages in various aspects, comprising easy operation.

It has been proved that touch controlling technology has won support among the people.

With the development of science and technology, many small devices become able to integrate their functions in one. Therefore, the consumer only has to carry one device that has integrated multiple functions, but carry many devices at once, which reduces the burden for the consumer and save the space occupied by these devices.

Likewise, the function of illumination can also be integrated into some electronic devices, such as cell phones. Most cell phones on the market nowadays have this application of flashlight. However, the function is relatively simple, which only has two states that are turning on and off the illumination.

Besides, due to the influence in various aspects, such as the shape of cell phone, the flashlight function of the electronic devices like cell phone on the market today cannot satisfy the various needs of the consumer for the portable illumination device.

SUMMARY OF THE PRESENT INVENTION

A main advantage of the present invention is to provide a portable illumination device and touch control system and touch control method thereof, wherein the brightness of the portable illumination device can be regulated by means of touching.

Another advantage of the present invention is to provide a portable illumination device and touch control system and touch control method thereof, which has the advantage of easy operation.

Another advantage of the present invention is to provide a portable illumination device and touch control system and touch control method thereof, wherein the appearance of the portable illumination device is tidy.

Another advantage of the present invention is to provide a portable illumination device and touch control system and touch control method thereof, wherein the touch control system can be utilized to regulate the brightness of a light source, wherein the touch control system can be used on a portable illumination device.

Another advantage of the present invention is to provide a portable illumination device and touch control system and touch control method thereof, wherein the light intensity of the portable illumination device can be identified easily.

Another advantage of the present invention is to provide a portable illumination device and touch control system and touch control method thereof, wherein the portable illumination device comprises an operation instruction element so as to provide a prompt for the touch operation of the portable illumination device.

Another advantage of the present invention is to provide a portable illumination device and touch control system and touch control method thereof, wherein the portable illumination device can be connected to an external electronic device, so as to regulate the illumination device through operating the external electronic device.

Additional advantages and features of the invention will become apparent from the description which follows, and may be realized by means of the instrumentalities and combinations particular point out in the appended claims.

According to the present invention, the foregoing and other objects and advantages are attained by a portable illumination device comprising a light source having a plurality of brightness levels and a touch control system, which is arranged for controlling an illumination of the light source, comprising a control system and a touch panel operatively connected to the control system, wherein the touch panel is configured for receiving a sliding touch operation, wherein the control system adjusts a current brightness level of the light source into an adjacent brightness level of the plurality of brightness levels in response to the sliding touch operation applied on the touch panel.

The present invention further provides a method of controlling illumination of a portable illumination device, wherein the portable illumination device comprises a light source having a plurality of brightness levels, wherein the method comprises the following steps.

(a) Detect a sliding touch operation on a touch panel.

(b) Generate a control command corresponding to the sliding touch operation.

(c) Adjust a current brightness level of the light source into an adjacent brightness level of the plurality of brightness levels in response to the control command.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
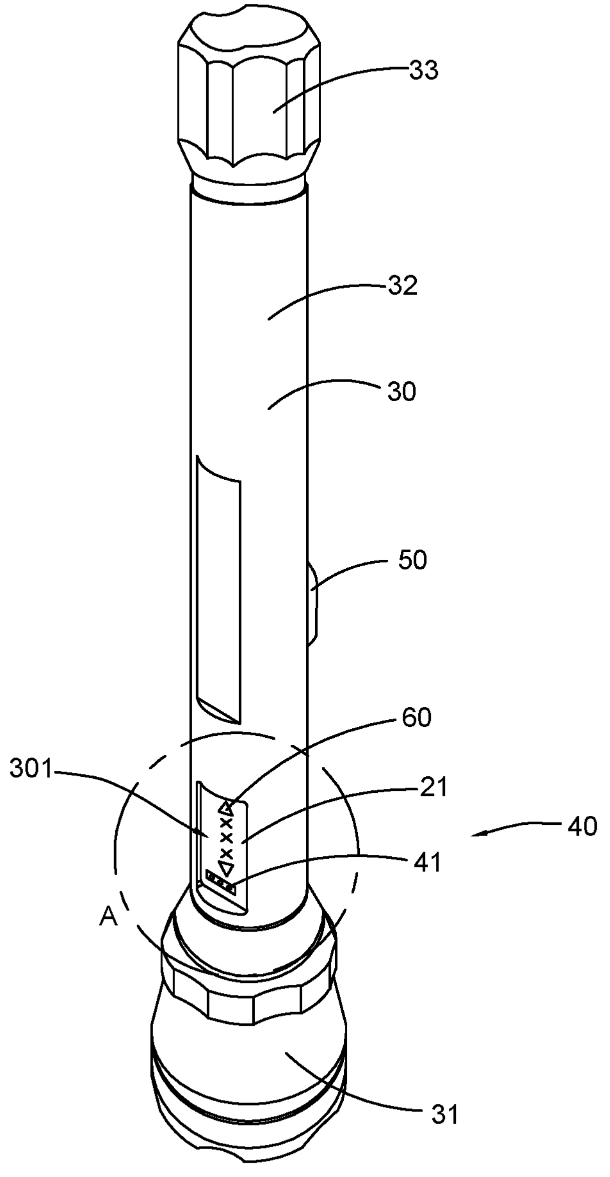
FIG. 1 is a perspective view illustrating a portable illumination device according to a first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The following is disclosed in order that those skilled in the art can implement the present invention. Preferred embodiments in the following descriptions are to give examples only. Those skilled in the art can think of other obvious modifications. The basic notions of the present invention defined in the following descriptions can apply to other implementations, modifications, improvements, equivalences, and other technical solutions that do not deviate the scope or spirit of the present invention.

Those skilled in the art should understand that, in the disclosure of the present invention, terminologies of "longitudinal," "lateral," "upper," "lower," "front," "back," "left," "right," "perpendicular," "horizontal," "top," "bottom," "inner," "outer," and more that indicate relations of direction or position are based on the relations of direction or position shown in the appended drawings, which is only for ease of describing the present invention and simplifying the description, rather than to indicate or imply that the referred device or element has to apply specific direction or to be operated or structured in specific direction. Therefore the above-mentioned terminologies shall not be interpreted as confine to the present invention.

FIGS. 1-3 and 4A-4F of the drawings illustrate a portable illumination device according to a first preferred embodiment of the present invention. The portable illumination device comprises a light source 10, a touch control system 20, and a housing 30. The light source 10 and the touch control system 20 are arranged at the housing 30, so as to be supported and protected by the housing 30 and to provide a beautiful outward appearance for the portable illumination device.

The touch control system 20 comprises a touch panel 21 and a control system 22. The touch panel 21 is arranged for being operated easily so as to control the illumination provided by the portable illumination device. The control system 22 utilizes the touch panel 21 to receive the control operation of users and responds to the control operation, so as to control the light source 10. In other words, the control system 22 is arranged to enable the controlling of the brightness of the illumination of the light source 10 of the portable illumination device.

Figure 2:
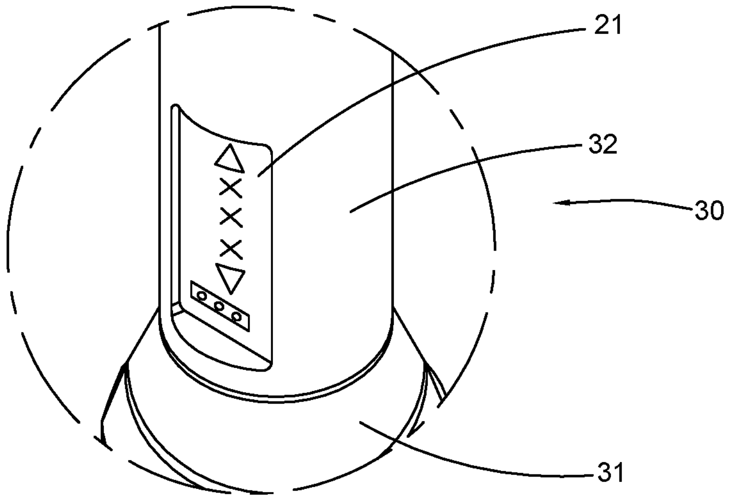
FIG. 2 is a partially enlarged view illustrating the portable illumination device according to the above first preferred embodiment of the present invention.

Referring to FIGS. 1 and 2, the touch panel 21 is arranged at the housing 30 and is adapted to the outward appearance of the housing 30, so as to make the outward appearance of the portable illumination device be coordinated. More specifically, the housing 30 has an accommodating groove 301 for accommodating the touch panel 21. The size and shape of the accommodating groove 301 match with the size and shape of the touch panel 21, so that the touch panel 21 can be firmly arranged in the accommodating groove 301 and can be easily operated.

Figures 4A, 4B, 4C, 4D, 4E, 4F:
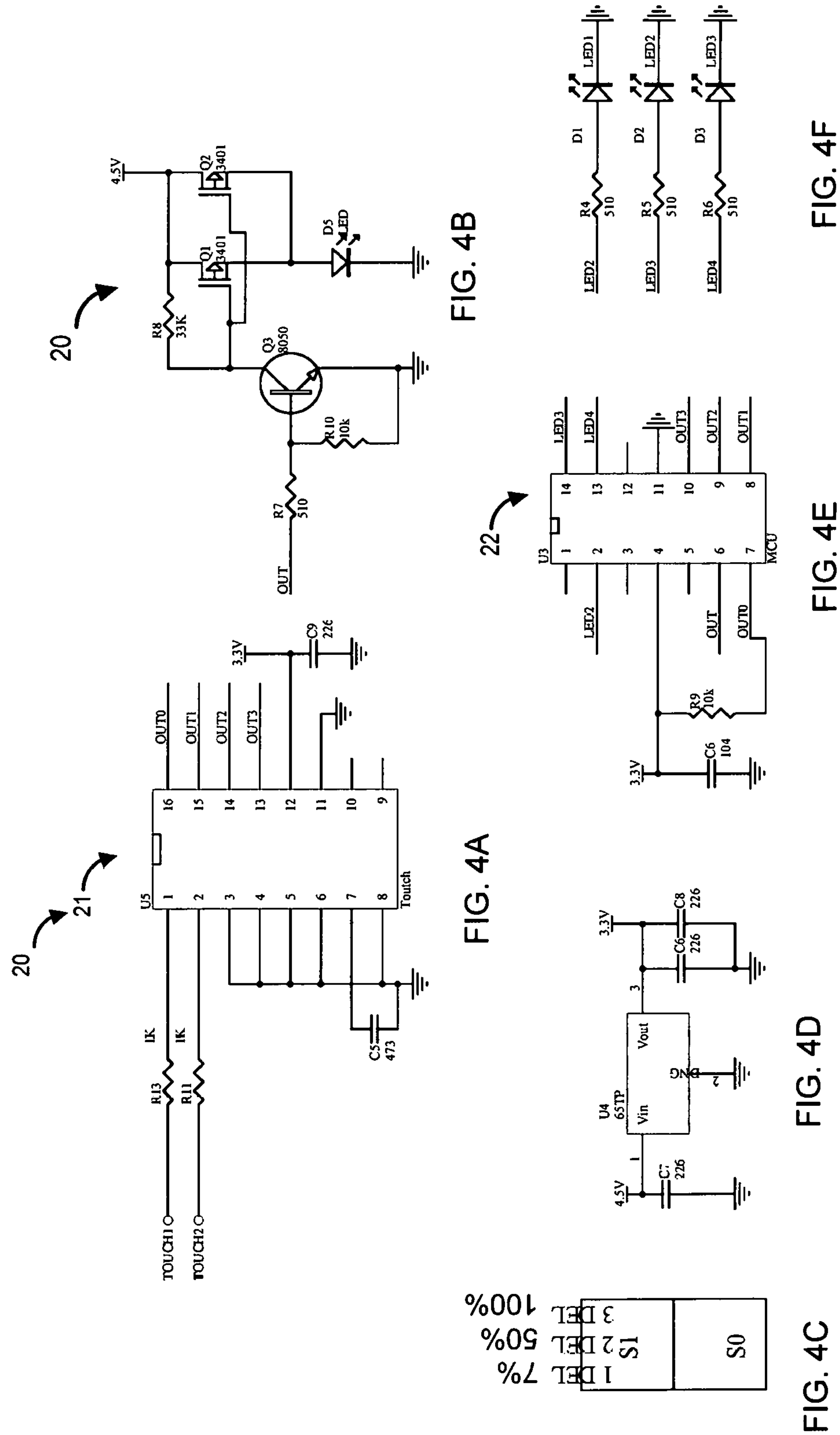
FIGS. 4A-4F are schematic diagrams illustrating circuits of touch system of the portable illumination device according to the above first preferred embodiment of the present invention.

It is worth mentioning that the portable illumination device further comprises an indication component 40. The indication component 40 is utilized for indicating the current illumination mode of the light source 10. According to the above first preferred embodiment of the present invention, the indication component 40 is utilized for indicating the light intensity of the illumination of the light source 10 of the portable illumination device. According to the above first preferred embodiment of the present invention, a plurality of indicator lights 41 are used to indicates that the luminous intensity of the portable illumination device, for example, the luminous intensity of the portable illumination device is divided into three levels: 7%, 50%, and 100%, as shown in FIG. 4C of the drawings. Correspondingly, the indication component 40 comprises three indicator lights 41. Illumination of one of the three indicator lights 41 indicates that the luminous intensity of the portable illumination device is 7%. Illumination of two of the three indicator lights 41 indicates that the luminous intensity of the portable illumination device is 50%. Illumination of the total three indicator lights 41 indicates that the luminous intensity of the portable illumination device is 100%. According to the above first preferred embodiment of the present invention, the indicator lights 41 are arranged in the housing 30. Specifically, the indicator lights 41 are arranged at the inner side of the touch panel 21. The light emitted from the indicator lights 41 can pass through the touch panel 21 so as to be identified. According to the above first preferred embodiment of the present invention, the touch panel 21 is made of light permeable material. It is worth mentioning that arrangement of the indicator lights 41 at the inner side of the touch panel 21 is beneficial for the user to judge the current luminous intensity of the portable illumination device before regulating the portable illumination device, which further facilitates his or her regulation. Nevertheless, this arrangement is just an embodiment of the present invention, but not a limit thereof. According to other embodiment of the present invention, the indicator lights 41 can also be arranged at other positions. The present invention shall not be limited in this aspect as long as an object of the present invention can be achieved.

Figure 3:
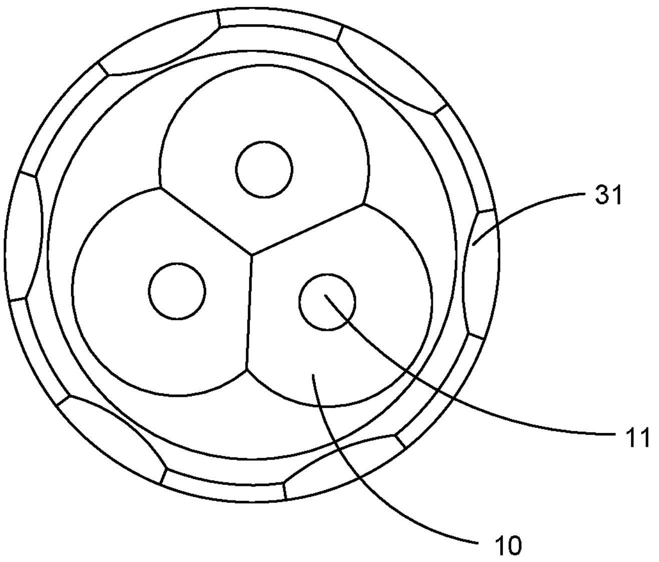
FIG. 3 illustrates a light source of the portable illumination device according to the above first preferred embodiment of the present invention.

The light source 10 is arranged to provide light source for the portable illumination device. Referring to FIG. 3, according to the above first preferred embodiment of the present invention, the light source 10 comprises a series of illumination elements 11. The illumination element 11 is connected with other elements of the portable illumination device, so as to form a predetermined circuit to implement predetermined illumination functions of the portable illumination device. According to the above first preferred embodiment of the present invention, the illumination element 11 is embodied as a light emitting element, wherein the light emitting element can emit light under an electric power supply.

The portable illumination device further comprises a mechanical switch 50 for switching the portable illumination device between an off-state and an on-state. According to the above first preferred embodiment of the present invention, when the portable illumination device is in the on-state, the luminous intensity of the light source 10 of the portable illumination device can be regulated through operating the touch panel 21. When the portable illumination device is in the off-state, the portable illumination device does not emit light.

It is worth mentioning that according to the above first preferred embodiment of the present invention, the touch switch has a constant electricity supply, but keeping the constant electrical connection can also cause unnecessary wastage of electricity. The arrangement of the mechanical switch 50 is for controlling the opening and closing of the total circuit of the portable illumination device. This arrangement is suitable for the actual needs of outdoor appliances.

FIGS. 4A-4F are schematic diagrams illustrating the circuits of the touch control system of the portable illumination device according to the above first preferred embodiment of the present invention. FIG. 4A illustrates the circuit of the touch panel 21 of the touch control system 20. FIG. 4D illustrates the power supply circuit of the touch control system 20. FIG. 4E illustrates the circuit structure of the control system 22 of the touch control system 20.

The light source 10, the touch control system 20, the indication component 40, and the mechanical switch of the portable illumination device jointly form the circuit of the portable illumination device, so as to allow the portable illumination device to have the predetermined functions.

Referring to FIG. 1, the housing 30 comprises a housing head 31, a casing body 32, and a housing end 33. The casing body 32 integrally extends between the housing head 31 and the housing end 33. The illumination element 11 of the light source 10 is arranged in the housing head 31. The control system 22 of the touch control system 20 is arranged in the casing body 32. The housing end 33 and the housing head 31 are respectively arranged on the two ends of the casing body 32 to make the entire housing 30 a closed accommodating chamber.

According to the above first preferred embodiment of the present invention, when regulating the state of the portable illumination device into the on-state through the mechanical switch 50, sliding on the surface of the touch panel 21 toward the direction of the housing head 31 makes the luminous intensity of the portable illumination device increase for one level, for example, from 7% to 50%. When there is a sliding touch operation on the surface of the touch panel 21 toward the direction of the housing end 33, the luminous intensity of the portable illumination device will be decreased for one level, say, from 50% to 7%. When the luminous intensity of the portable illumination device reaches the maximum level, 100%, and when there is further sliding touch operation toward the direction of the housing head 31, the luminous intensity of the portable illumination device will turn to the minimum level that is 7% according to the above first preferred embodiment of the present invention. When the luminous intensity of the portable illumination device reaches the minimum level, 7%, and when there is further sliding touch operation toward the direction of the housing end 33, the luminous intensity of the portable illumination device will turn to the maximum level that is 100% according to the above first preferred embodiment of the present invention. In other words, the regulation of the luminous intensity of the portable illumination device forms a circulating regulation. Accordingly, different power levels are provided for providing different brightness levels of the portable illumination device. Alternatively, different numbers of illumination components are switched on to provide the different brightness levels of the portable illumination device. The brightness levels also may not be arranged in the gradually increasing or decreasing order, such a circle order of 7%, 100% and 50%.

It is worth mentioning that the regulation setting that sliding on the surface of the touch panel 21 toward the direction of the housing head 31 makes the luminous intensity of the portable illumination device increase for one level, while sliding on the surface of the touch panel 21 toward the direction of the housing end 33 makes the luminous intensity of the portable illumination device decrease for one level, it is just an embodiment rather than a limit of the present invention. According to other embodiment of the present invention, it can also be that sliding on the surface of the touch panel 21 toward the direction of the housing head 31 makes the luminous intensity of the portable illumination device decrease for one level, while sliding on the surface of the touch panel 21 toward the direction of the housing end 33 makes the luminous intensity of the portable illumination device increase for one level. The present invention is not limited in this aspect.

A person skilled in the art should be able to understand that this regulation method of utilizing up-down slide operations for regulation is also an embodiment rather than limit to the present invention. According to another embodiment of the present invention, it can also regulate the luminous intensity through sliding left and right. According to another embodiment of the present invention, it can also regulate the luminous intensity through other mode of regulation, comprising clicking. The present invention shall not be limited in this aspect as long as an object of the present invention can be achieved.

It is worth mentioning that, according to other embodiment of the present invention, the portable illumination device can also achieve a connection with external electronic device through methods such as wireless connection, etc., and regulate the portable illumination device through the external electronic device.

The portable illumination device according to the present invention may also be set with more than one regulation modes for luminous intensity. For example, it can apply gravity sensing to the regulation of luminous intensity while conducting the touch controlling. For instance, the luminous intensity turns weaker if the portable illumination device is facing down, while the luminous intensity turns stronger if held horizontally. Two or more regulation modes can be respectively utilized in various conditions or in combination. The present invention is not limited in this aspect.

Referring to FIGS. 1 and 2, the portable illumination device further comprises an operation instruction element 60 for providing prompts for the touch operation of the portable illumination device. According to the above first preferred embodiment of the present invention, the operation instruction element 60 is arranged on the touch panel 21 so as to easily be utilized for prompting. A person skilled in the art should be able to understand that the operation instruction element 60 being arranged on the touch panel 21 is just an embodiment rather than a limit to the present invention. According to other embodiment of the present invention, the operation instruction element 60 can also be arranged at other position around the touch panel 21 or other position on the illumination device. The present invention is not limited in this aspect.

It is worth mentioning that the setting of the three types of luminous intensity corresponding to the three indicator lights 41 is just an embodiment rather than a limit to the present invention. According to other settings of the present invention, there can be other number of indicator lights 41 or it can apply other method to indicate the luminous intensity of the portable illumination device. For one example, every two of the six indicator lights indicate a brightness level. For another example, less lights on indicates weak luminous intensity, while more lights on indicates strong luminous intensity. The present invention is not limited in this aspect. Alternatively, each indicator light 41 indicates a corresponding brightness level, different indicator lights 41 indicate a corresponding different brightness levels respectively.

It is worth mentioning that according to the above first preferred embodiment of the present invention, the luminous intensity of the portable illumination device is arranged for three levels, but the specific luminous intensities of these three levels are just an embodiment rather than a limit to the present invention. Luminous intensities of the portable illumination device according to other embodiment of the present invention can also be in other ratios, such as 30%, 50%, and 100%. The present invention is not limited in this aspect. The quantity of the level arranged for the luminous intensity of the portable illumination device can also be other number, such as two, four, or more than four, based on the needs, which is not limited in the present invention.

According to the above preferred embodiment of the present invention, the control system 22 of the touch control system 20 changes the light emitting mode of the light source 10 through changing the electrical connection.

It is worth mentioning that the touch control system 20 can not only be utilized on the portable illumination device according to the above first preferred embodiment of the present invention, but also be arranged on an electronic device, such as a cell phone, so as to provide the cell phone a function of regulating the light intensity of an illumination element through touch controlling. In this case, the illumination element of the cell phone can be utilized for not only a flashlight, but a flashing light of the cell phone camera. In other words, the light intensity of the flashing light of the cell phone camera is regulated through touch controlling. Alternatively, the touch control system 20 is integrated to an electronic device which is wirelessly connected to the portable illumination device, or an application providing an interface of the touch control panel 21 can be installed on the electric device, so that the user can operate on the electric device to control the light intensity of the portable illumination device. Similarly, by sliding operation on the electric device, the brightness level of the portable illumination device is adjusted.

Figure 5:
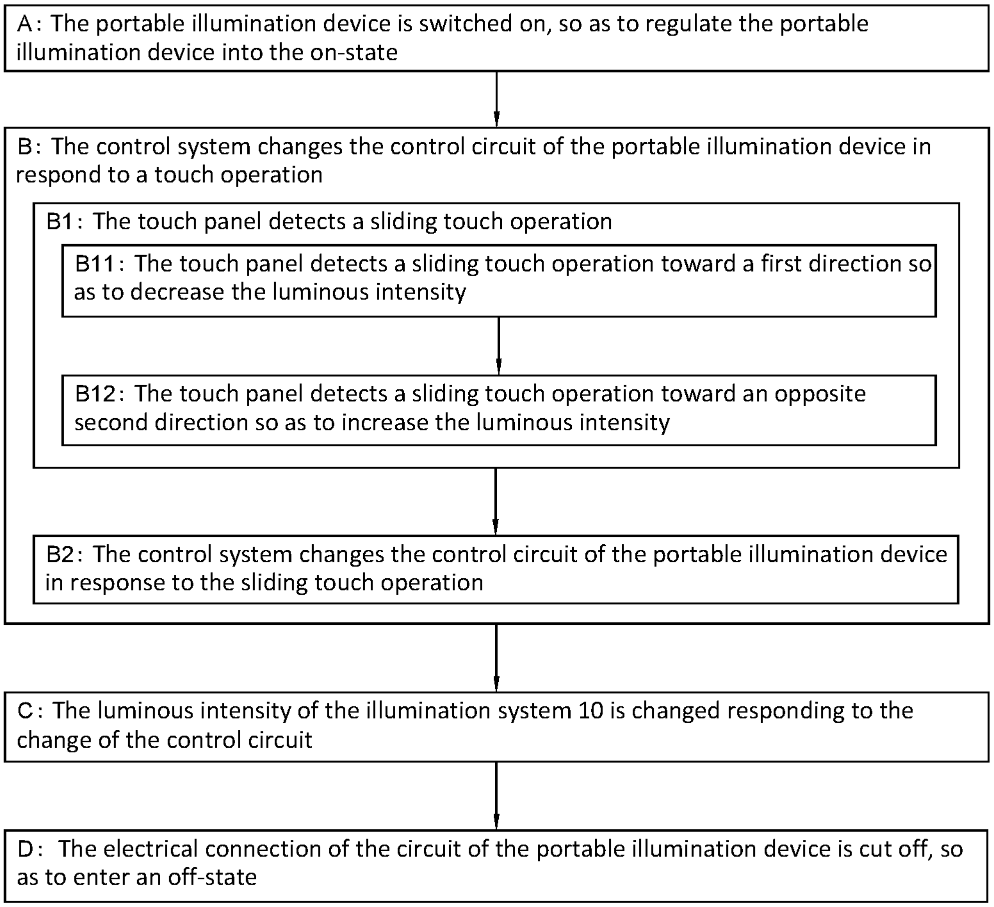
FIG. 5 illustrates a touch control method according to the above first preferred embodiment of the present invention, which can be applied to regulating and controlling the portable illumination device.

FIG. 5 illustrated a touch control method according to the above first preferred embodiment of the present invention, which can be applied to regulating and controlling the portable illumination device. The touch control method comprises the following steps:

A: The portable illumination device is switched on, so as to regulate the portable illumination device into the on-state.

B: The control system 22 changes the control circuit of the portable illumination device responds to a touch operation.

C: The luminous intensity of the illumination system 10 is changed responding to the change of the control circuit; and D: The electrical connection of the circuit of the portable illumination device is cut off, so as to enter an off-state.

According to the above first preferred embodiment of the present invention, the touch operation is conducted through sliding. step (B) further comprises the following steps:

B1: The touch panel 21 detects a sliding touch operation; and

B2: The control system 22 changes the control circuit of the portable illumination device in response to the sliding touch operation.

More specifically, the step (B1) further comprises the following steps:

B11: The touch panel 21 detects a sliding touch operation toward a first direction so as to decrease the luminous intensity of the illumination system 10; and B12: The touch panel 21 detects a sliding touch operation toward an opposite second direction so as to increase the luminous intensity of the illumination system 10.

It is worth mentioning that the touch control method can be utilized on not only the portable illumination device according to the above first preferred embodiment of the present invention, but also other touch control portable illumination device. The present invention is not limited in this aspect.

It is worth mentioning that the order of the steps of the touch control method illustrated in FIG. 5 is only an embodiment rather than a limit to the present invention. Touch control methods according to other embodiment of the present invention can also be in other orders. The present invention shall not be limited in this aspect as long as an object of the present invention can be achieved.

FIGS. 6-9 of the drawings illustrate a portable illumination device according to a second preferred embodiment of the present invention. The portable illumination device comprises at least a light emitting element 100 and a touch control system 200. The touch control system 200 is arranged to be able to regulate the luminous intensity of the light emitting element 100 by means of touching.

Figure 6:
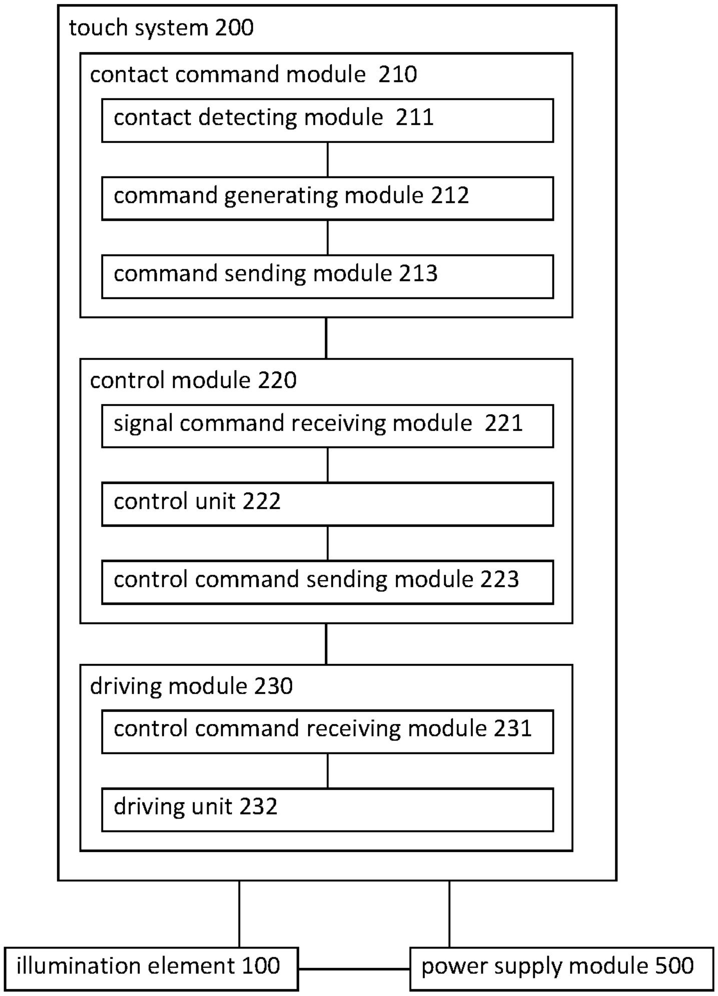
FIG. 6 illustrates a touch control system of a portable illumination device according to the above second preferred embodiment of the present invention.

FIG. 6 of the drawings illustrated the touch control system 200 of the portable illumination device according to the above second preferred embodiment of the present invention. Referring to FIG. 6, the touch control system 200 comprises a contact command module 210 and a control module 220. The control module 220 is operatively connected with the contact command module 210. When the contact command module 210 generates a predetermined contact command corresponding to a sliding touch operation, the control module 220 connected with the contact command module 210 can control the luminous intensity of the light emitting element 100 based on the contact operation.

Specifically, the contact command module 210 comprises a contact detecting module 211, a command generating module 212, and a command sending module 213. The contact detecting module 211 is arranged for detecting predetermined operations of users. The contact detecting module 211 transmits the detected signals of operations of the users to the command generating module 212. After the command generating module 212 received the signals from the contact detecting module 211, the command generating module 212 generates a corresponding signal command. The signal command is output to the control module 220 by the command sending module 213, such that the control module 220 can control the luminous intensity of the light emitting element 100 according to the received signal command.

The control module 220 controls the luminous intensity of the light emitting element 100 according to the signal command sent by the command sending module 213 of the contact command module 210. The control module 220 comprises a signal command receiving module 221, a control unit 222, and a control command sending module 223. The signal command receiving module 221 receives the signal command output and sent by the command sending module 213 and transmits the signal command to the control unit 222. The control unit 222 responds to the signal command to generate a corresponding control command. The control command generated by the control unit 222 based on the signal command is output by the control command sending module 223 so as to regulate the luminous intensity of the light emitting element 100.

According to the above second preferred embodiment of the present invention, the light emitting element 100 is embodied as a light emitting diode (LED). As a light emitting element, light emitter diode has advantages of energy saving and environmental friendly, high adaptability, high stability, short response time, etc.

Referring to FIG. 6, the touch control system 200 further comprises a driving module 230. The driving module 230 is arranged to drive the light emitter diode, that is, the light emitting element 100, so as to render the light emitting element 100 illuminate. The driving module 230 is operatively connected with the control module 220, so that the control command sending module 223 of the control module 220 can output the control signal generated by the control unit 222 responding to the control command to the driving module 230.

The driving module 230 amplifies the control signal after received it, so that the luminous intensity of the light emitting element 100 driven by the driving module 230 is regulated and controlled.

Referring to FIG. 6, the driving module 230 comprises a control command receiving module 231 and a driving unit 232. The control command receiving module 231 and the control command sending module 223 of the control module 220 are operatively connected, such that the control command receiving module 231 can receive the control signal sent by the control command sending module 223. The driving unit 232 and the light emitting element 100 are electrically connected. Then the driving unit 232 enlarges the control signal received by the control command receiving module 231 to control the luminous intensity of the light emitting element 100.

The portable illumination device further comprises a power supply module 500. Referring to FIG. 6, the power supply module 500 and the light emitting element 100 and the touch control system 200 are electrically connected. The power supply module 500 can provide electric power for the light emitting element 100 to illuminate. When the portable illumination device is in an on-state, the power supply module 500 and the light emitting element 100 and the touch control system 200 form a closed circuit, so that the light emitting element 100 can shine and illuminate and the light intensity of the illumination of the light emitting element 100 can be regulated and controlled by means of touching.

Figure 7A:
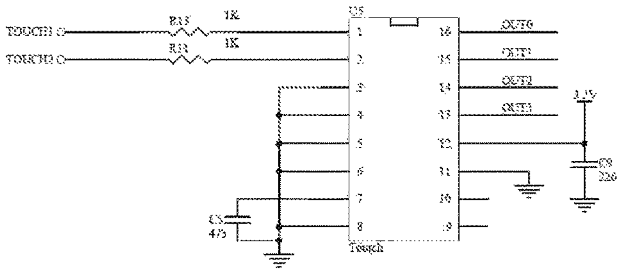
FIG. 7A is a perspective view of a circuit structure of the contact module of the touch control system according to the above second preferred embodiment of the present invention.

FIG. 7A of the drawings is a perspective view of a circuit structure of the contact command module 210 of the touch control system 200 according to the above second preferred embodiment of the present invention.

Figure 7B:
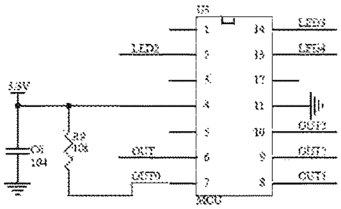
FIG. 7B is a perspective view of a circuit structure of the control module of the touch control system according to the above second preferred embodiment of the present invention.

FIG. 7B of the drawings is a perspective view of a circuit structure of the control module 220 of the touch control system 200 according to the above second preferred embodiment of the present invention.

Figure 7C:
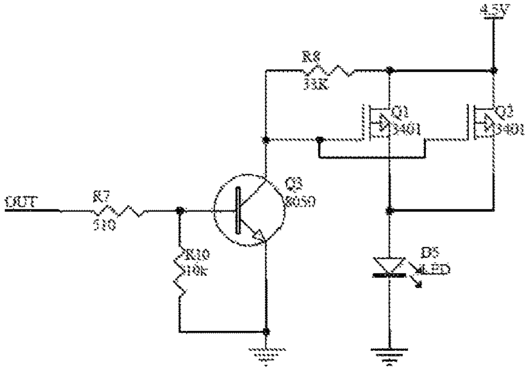
FIG. 7C is a perspective view of a circuit structure of the driving module of the touch control system according to the above second preferred embodiment of the present invention.

FIG. 7C of the drawings is a perspective view of a circuit structure of the driving module 230 of the touch control system 200 according to the above second preferred embodiment of the present invention.

Figure 7D:
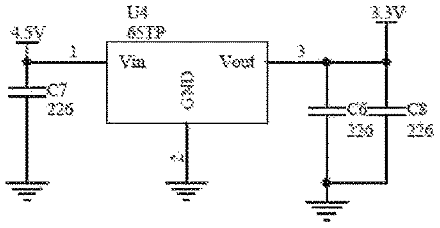
FIG. 7D illustrates a perspective view of circuit structure of a power supply module of the portable illumination device according to the above second preferred embodiment of the present invention.

FIG. 7D of the drawings is a perspective view of a circuit structure of the power supply module 500 of the touch control system 200 according to the above second preferred embodiment of the present invention.

According to the above second preferred embodiment of the present invention, the contact command module 210 is embodied to detect and identify touching signal. More specifically, the contact command module 210 is embodied as a module for detecting and identify a sliding touch operation. According to the above second preferred embodiment of the present invention, the contact detecting module 211 of the contact command module 210 can detect sliding touch operations comprising of a first direction sliding touch operation and a second direction sliding touch operation. The first direction sliding touch operation and the second direction sliding touch operation are two sliding touch operations with different opposite directions. When the contact detecting module 211 detects a sliding touch operation of sliding toward a first direction, if the brightness of the light emitting element 100 has not reached the predetermined maximum brightness, the brightness of the light emitting element 100 will be increased for one level. When the contact detecting module 211 detects a sliding touch operation of sliding toward a second direction, if the brightness of the light emitting element 100 has not reached the predetermined minimum brightness, the brightness of the light emitting element 100 will be decreased for one level. When the contact detecting module 211 detects a sliding touch operation of sliding toward a first direction, if the brightness of the light emitting element 100 has reached the predetermined maximum brightness, the brightness of the light emitting element 100 will not be further increased, but be regulated to the predetermined minimum brightness level. When the contact detecting module 211 detects a sliding touch operation of sliding toward a second direction, if the brightness of the light emitting element 100 has reached the predetermined minimum brightness, the brightness of the light emitting element 100 will not be further decreased, but be regulated to the predetermined maximum brightness level. That is to say, the level of the light intensity of the light emitting element 100 can respectively be regulated and controlled in two opposite circulating orders through respectively detecting sliding touch operations of two different directions. A person skilled in the art should be able to understand the object of the setting that arranges sliding touch operations of two different directions to respectively regulate and control the luminous intensity of the light emitting element 100 according to two opposite circulating orders so as to allow the user to choose his or her operating mode of regulation to manipulate the light intensity through fewer operation steps. However, such setting of utilizing sliding touch operations of two different directions to respectively regulate and control the luminous intensity of the light emitting element 100 according to two opposite circulating orders is just an embodiment rather than a limit to the present invention. According to other embodiment of the present invention, the luminous intensity of the light emitting element 100 can also be regulated according to only one predetermined circulating order. The present invention shall not be limited in this aspect as long as an object of the present invention can be achieved.

Figure 8:
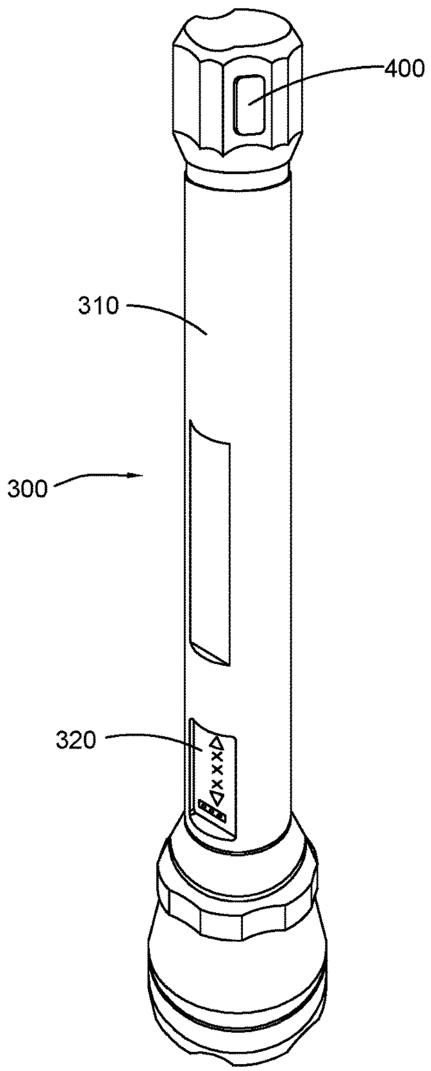
FIG. 8 illustrates a 3D perspective view of the portable illumination device according to the above second preferred embodiment of the present invention.

Referring to FIG. 8, the portable illumination device further comprises a shell 300. According to the above second preferred embodiment of the present invention, the shell 300 is embodied as a flashlight housing. The portable illumination device is embodied as a flashlight.

The shell 300 comprises a shell body 310 and a touch pad 320. The shell body 310 provides an accommodating space for accommodating the light emitting element 100 and the touch control system 200. The touch pad 320 is firmly mounted on the shell body 310. The touch control system 200 and the contact command module 210 are arranged on the touch pad 320 so that the touch pad 320 form a touch control panel that can be utilized for conducting touching operations to input touch signals to the contact command module 210.

Figure 9:
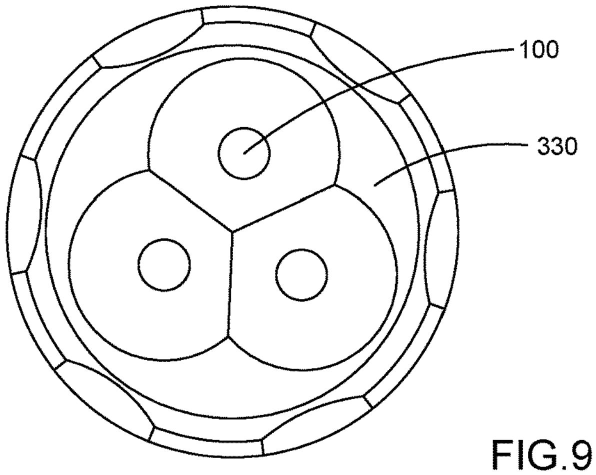
FIG. 9 illustrates at least a light emitting element and a light permeable element of the portable illumination device according to the above second preferred embodiment of the present invention.

Referring to FIG. 9, the shell 300 further comprises a light permeable element 330. The light permeable element 330 is mounted on the shell body 310. The mounting positions of the light permeable element 330 and the light emitting element 100 are adapted to each other, so that the light emitted from the light emitting element 100 can pass through the light permeable element 330 to provide an illuminated environment.

Referring to FIG. 9, the portable illumination device further comprises a switch 400 which is a mechanical switch. The switch 400 is mounted on the shell 300. The switch 400 is arranged for controlling the cutting off and closing of the circuit formed with the touch control system 200 and the light emitting element 100 and the power supply module 500. According to the above second preferred embodiment of the present invention, the switch 400 can be operated by being pressed down. It can be switched to cut off and close the circuit formed with the touch control system 200 and the light emitting element 100 and the power supply module 500 by one press operation.

Figure 10:
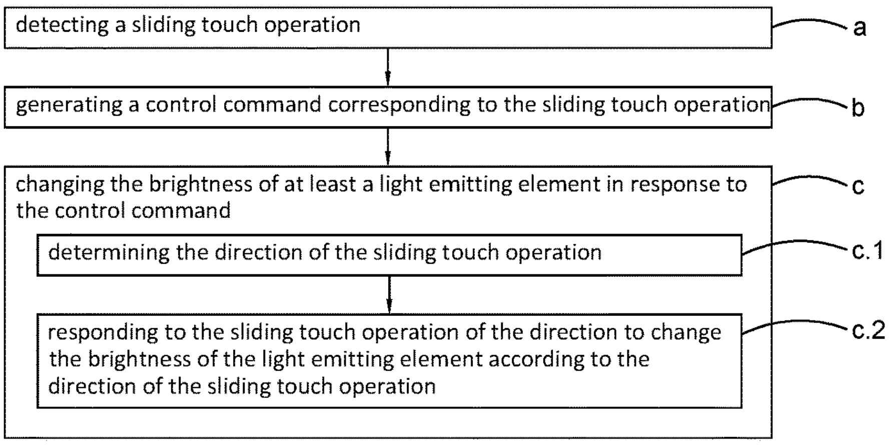
FIG. 10 illustrates a touch control method of portable illumination device according to the above second preferred embodiment of the present invention.

FIG. 10 of the drawings illustrated a touch control method of the portable illumination device according to the above second preferred embodiment of the present invention. The touch control method comprises the following steps:

(a) detecting a sliding touch operation;

(b) generating a control command corresponding to the sliding touch operation;

(c) changing the brightness of at least a light emitting element in response to the control command.

According to the above second preferred embodiment of the present invention, the touch command received in the step (b) is a sliding touching command.

Step (c) further comprises the following steps:

(c.1) determining the direction of the sliding touch operation and (c.2) responding to the sliding touch operation of the direction to change the brightness of the light emitting element according to the direction of the sliding touch operation.

Figure 11:
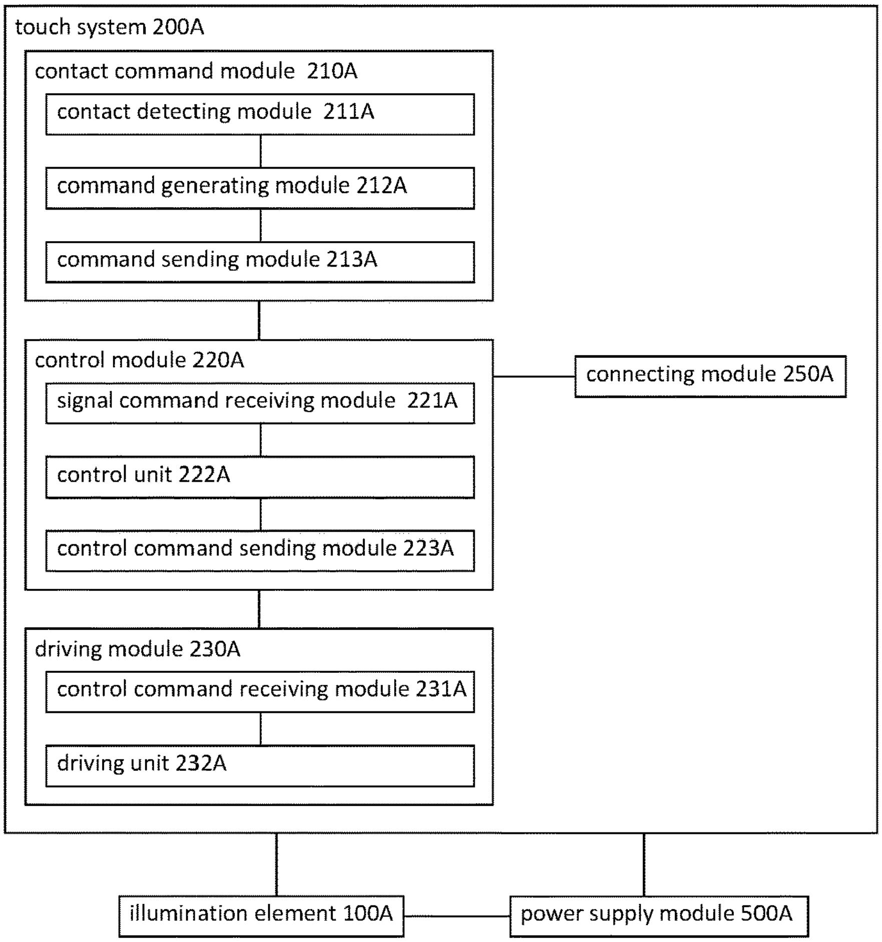
FIG. 11 illustrates a touch control system of a portable illumination device according to the above third preferred embodiment of the present invention.
Figure 12A:
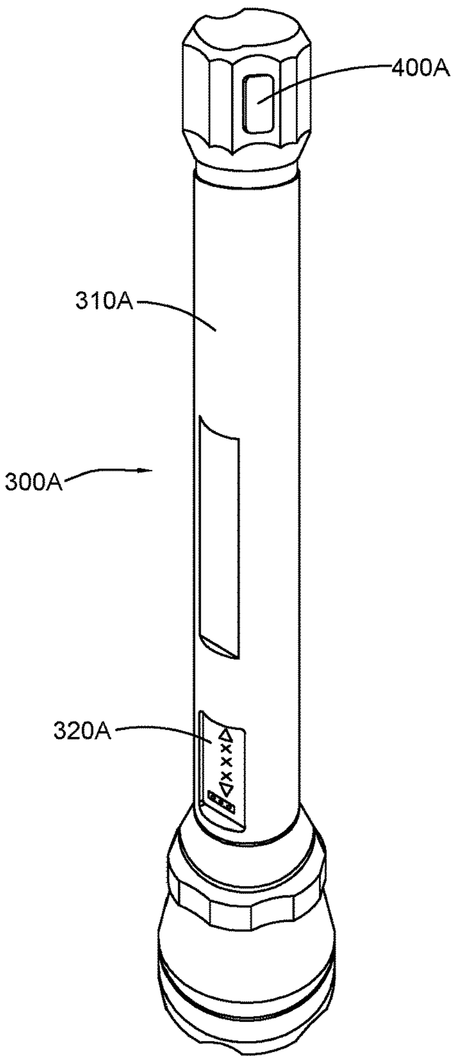
FIG. 12A is a perspective view of the portable illumination device according to the above third preferred embodiment of the present invention.
Figure 12B:
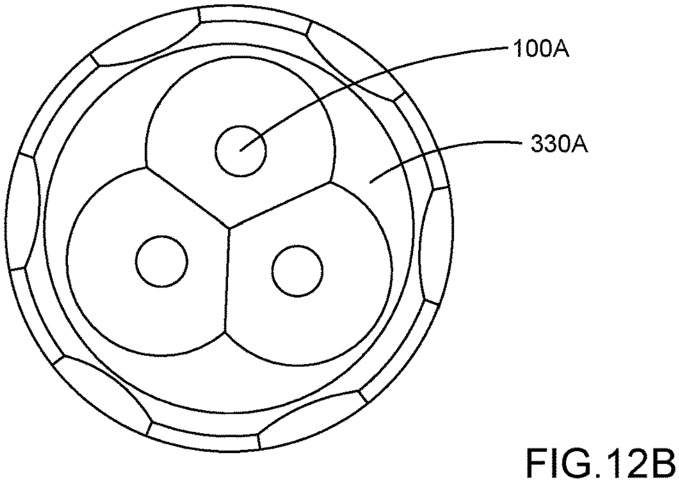
FIG. 12B illustrates at least a light emitting element and a light permeable element of the portable illumination device according to the above third preferred embodiment of the present invention.
Figure 13:
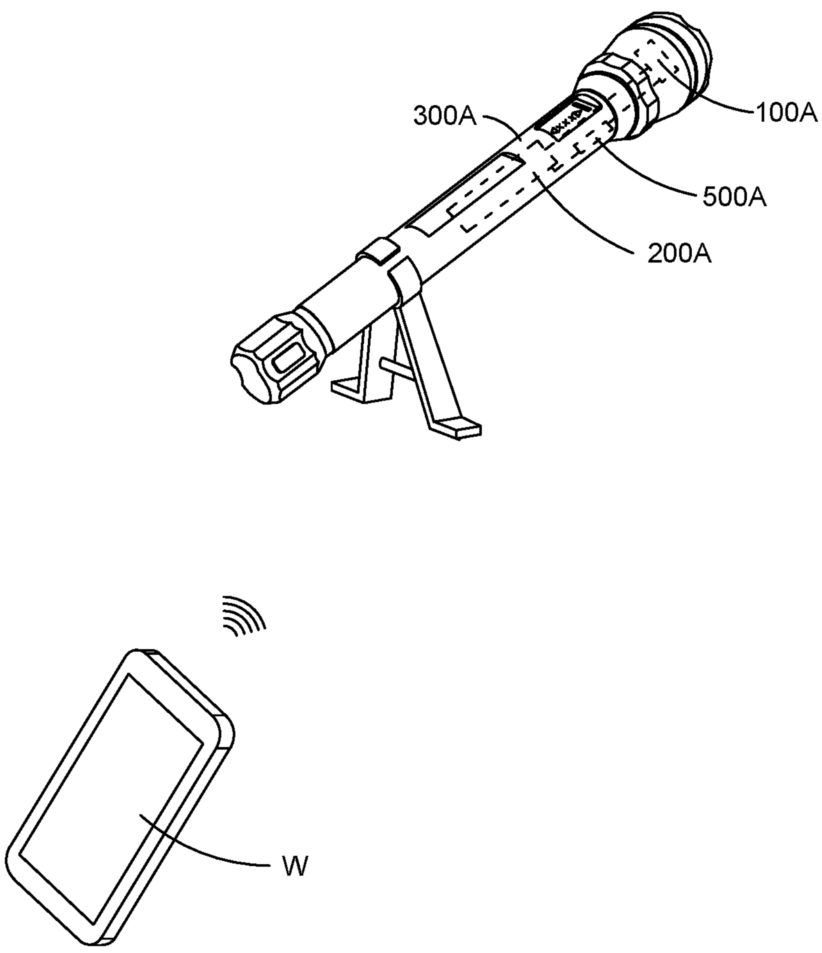
FIG. 13 is an application view of the portable illumination device according to the above third preferred embodiment of the present invention.

FIGS. 11-13 of the drawings illustrated a portable illumination device according to a third preferred embodiment of the present invention. The portable illumination device comprises at least a light emitting element 100A and a touch control system 200A. The touch control system 200A is arranged to be able to regulate the luminous intensity of the light emitting element 100A by means of touching.

FIG. 11 of the drawings illustrates the touch control system 200A of the portable illumination device according to the above third preferred embodiment of the present invention. Referring to FIG. 11, the touch control system 200A comprises a contact command module 210A and a control module 220A. The control module 220A is operatively connected with the contact command module 210A. When the contact command module 210A detect a predetermined contact operation such a sliding touch operation, the control module 220A connected with the contact command module 210A can control the luminous intensity of the light emitting element 100A based on the contact operation.

Specifically, the contact command module 210A comprises a contact detecting module 211A, a command generating module 212A, and a command sending module 213A. The contact detecting module 211A is arranged for detecting a predetermined sliding touch operation. The contact detecting module 211A transmits the detected signal to the command generating module 212A. The command generating module 212A then generates a corresponding signal command. The signal command is output to the control module 220A by the command sending module 213A, such that the control module 220A can control the luminous intensity of the light emitting element 100A according to the received signal command.

The control module 220A controls the luminous intensity of the light emitting element 100A according to the signal command sent by the command sending module 213A of the contact command module 210A. The control module 220A comprises a signal command receiving module 221A, a control unit 222A, and a control command sending module 223A. The signal command receiving module 221A receives the signal command output and sent by the command sending module 213A and transmits the signal command to the control unit 222A. The control unit 222A responds to the signal command to generate a corresponding control command. The control command generated by the control unit 222A based on the signal command is output by the control command sending module 223A so as to regulate the luminous intensity of the light emitting element 100A.

According to the above third preferred embodiment of the present invention, the light emitting element 100A is embodied as a light emitting diode (LED). As a light emitting element, light emitter diode has advantages of energy saving and environmental friendly, high adaptability, high stability, short response time, etc.

Referring to FIG. 11, the touch control system 200A further comprises a driving module 230A. The driving module 230A is arranged to drive the light emitter diode, that is, the light emitting element 100A, so as to render the light emitting element 100A illuminate. The driving module 230A is operatively connected with the control module 220A, so that the control command sending module 223A of the control module 220A can output the control signal generated by the control unit 222A responding to the control command to the driving module 230A.

The driving module 230A amplifies the control signal after received it, so that the luminous intensity of the light emitting element 100A driven by the driving module 230A is regulated and controlled.

Referring to FIG. 11, the driving module 230A comprises a control command receiving module 231A and a driving unit 232A. The control command receiving module 231A and the control command sending module 223A of the control module 220A are operatively connected, such that the control command receiving module 231A can receive the control signal sent by the control command sending module 223A. The driving unit 232A and the light emitting element 100A are electrically connected. Then the driving unit 232A enlarges the control signal received by the control command receiving module 231A to control the luminous intensity of the light emitting element 100A.

The portable illumination device further comprises a power supply module 500A. Referring to FIG. 11, the power supply module 500A and the light emitting element 100A and the touch control system 200A are electrically connected. The power supply module 500A can provide electric power for the light emitting element 100A to shine. When the portable illumination device is in an on-state, the power supply module 500A and the light emitting element 100A and the touch control system 200A form a closed circuit, so that the light emitting element 100A can shine and illuminate and the light intensity of the illumination of the light emitting element 100A can be regulated and controlled by means of touching.

Referring to FIG. 12A, the portable illumination device further comprises a shell 300A. According to the above third preferred embodiment of the present invention, the shell 300A is embodied as a flashlight housing. The portable illumination device is embodied as a flashlight.

The shell 300A comprises a shell body 310A and a touch pad 320A. The shell body 310A provides an accommodating space for accommodating the light emitting element 100A and the touch control system 200A. The touch pad 320A is firmly mounted on the shell body 310A. The touch control system 200A and the contact module 210A are arranged on the touch pad 320A so that the touch pad 320A can be utilized for conducting touching operations to input touch signals to the contact module 210A.

Referring to FIG. 12B, the shell 300A further comprises a light permeable element 330A. The light permeable element 330A is mounted on the shell body 310A. The mounting positions of the light permeable element 330A and the light emitting element 100A are adapted to each other, so that the light emitted from the light emitting element 100A can pass through the light permeable element 330A to provide an illuminated environment.

Referring to FIG. 12A, the portable illumination device further comprises a switch 400A. The switch 400A is mounted on the shell 300A. The switch 400A is arranged for controlling the cutting off and closing of the circuit formed with the touch control system 200A and the light emitting element 100A and the power supply module 500A. According to the above third preferred embodiment of the present invention, the switch 400A can be operated by being pressed down. It can be switched to cut off and close the circuit formed with the touch control system 200A and the light emitting element 100A and the power supply module 500A by one press operation.

What is different from the above second preferred embodiment is that the signal command receiving module 221A can receive not only the signal command output from the contact command module 210A, but also the signal command output by an electronic device W and respond to operations such as sliding touch operations on the electric device W.

Specifically, the touch control system 200A further comprises a connecting module 250A. The control module 220A can be connected with the electronic device W through the connecting module 250A, so as to send the signal command from the electronic device W to the control module 220A and then regulate and control the luminous intensity of the light emitting element 100A. According to the above third preferred embodiment of the present invention, the connecting module 250A is a wireless connecting module. The control module 220A of the touch control system 200A is wirelessly connected with the electronic device W through the connecting module 250A. More specifically, the connecting module 250A can connect the control module 220A of the touch control system 200A to the electronic device W through Bluetooth.

The connecting module 250A can connect the signal command receiving module 221A of the control module 220A of the touch control system 200A of the portable illumination device to the electronic device W through Bluetooth, such that the electronic device W can be utilized to transmit signal command to the signal command receiving module 221A, so as to allow the luminous intensity of the portable illumination device to be regulated and controlled through operating on the electronic device W. Specifically, most of today's electronic devices have function of touch (touch control) and allow installation of APP. As the luminous intensity of the portable illumination device has to be controlled via the electronic device, one can install a corresponding APP on the electronic device W, such that when the APP is launched, he/she can send a signal command to the signal command receiving module 221A of the control module 220A through operating the electronic device W. Alternatively, the portable illumination device may directly receive a control command from the electronic device to adjust the luminous intensity of the portable illumination device.

The portable illumination device can be utilized by outdoor activity lover who is fishing at night. At this time, the angler may anchor the portable illumination device at a position which is a short distance away from himself while he is sitting in front of the fishing rod. Now, the angler may need to regulate the luminous intensity of the portable illumination device, but feel somewhat difficult to dismount the anchored portable illumination device. At this moment, the angler can utilize his carry-on electronic device W, such as a cell phone, to regulate and control the luminous intensity of the portable illumination device, as FIG. 13 illustrated.

According to the above third preferred embodiment of the present invention, the luminous intensity of the portable illumination device can be regulated through not only touch controlling the portable illumination device itself, but also remote controlling the electronic device W that is separated from the portable illumination device. A person skilled in the art should be able to understand that this regulation method illustrated in the above third preferred embodiment is just an embodiment rather than limit to the present invention. According to other embodiment of the present invention, it can also specially arrange a touch remote controller that matches with the portable illumination device, so as to use it to control the luminous intensity of the portable illumination device. The present invention shall not be limited in this aspect as long as an object of the present invention can be achieved.

It is worth mentioning that the operation on the electric device W is similar to the operation on the touch pad 320A. More specifically, the sliding touch operations on the electric device W are able to adjust the luminous intensity of the portable illumination device, and the brightness levels can be adjusted in a circular shifting manner.

Figure 14:
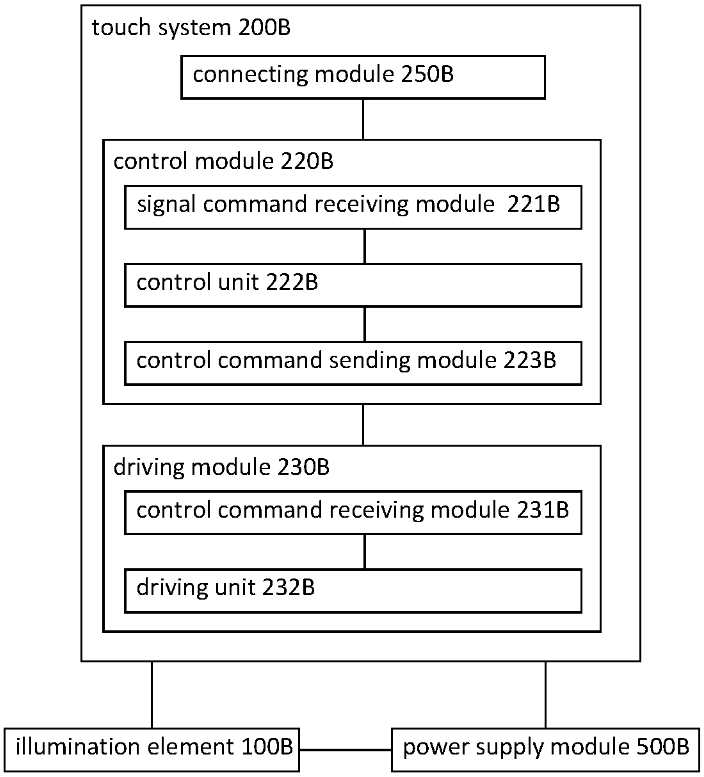
FIG. 14 illustrates a touch control system of a portable illumination device according to the above fourth preferred embodiment of the present invention.
Figure 15A:
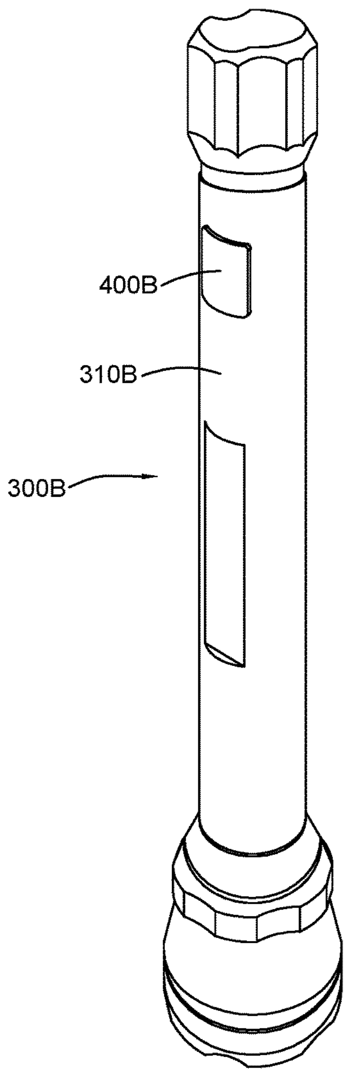
FIG. 15A is a perspective view of the portable illumination device according to the above fourth preferred embodiment of the present invention.
Figure 15B:
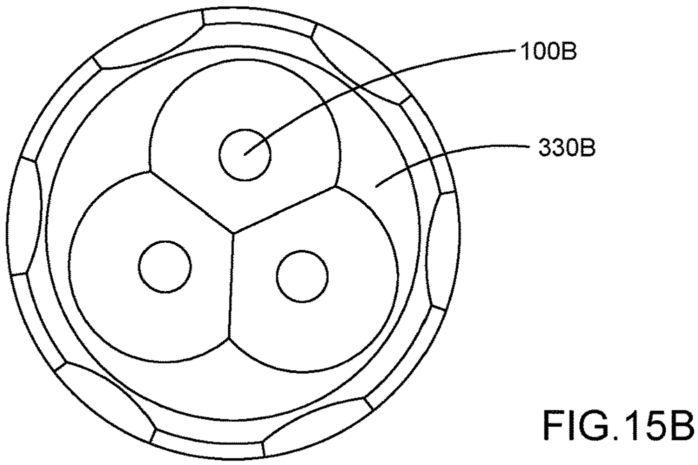
FIG. 15B illustrates at least a light emitting element and a light permeable element of the portable illumination device according to the above fourth preferred embodiment of the present invention.
Figure 16:
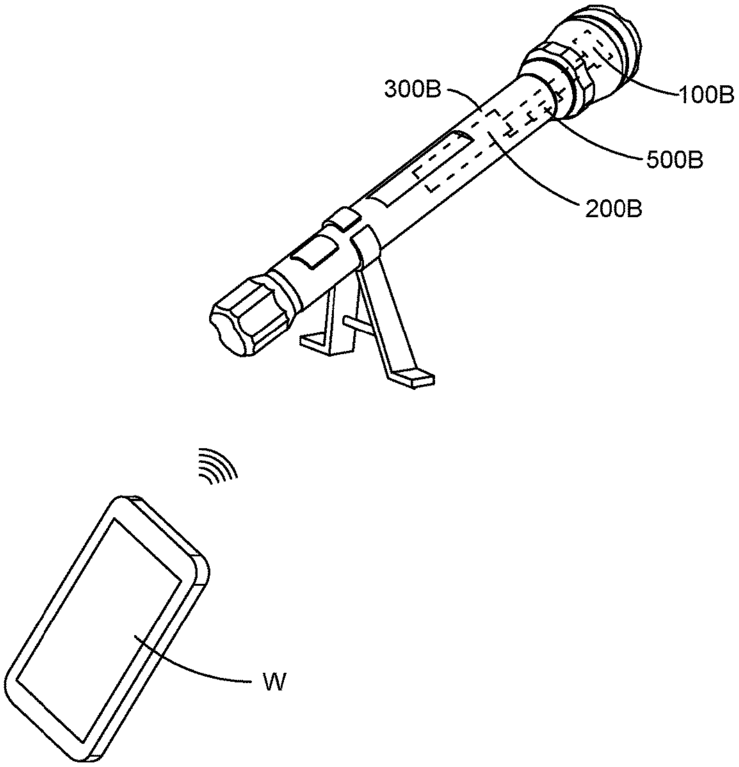
FIG. 16 is an application view of the portable illumination device according to the above fourth preferred embodiment of the present invention.

FIGS. 14-16 of the drawings illustrated a portable illumination device according to a fourth preferred embodiment of the present invention. The portable illumination device comprises at least a light emitting element 100B and a touch control system 200B. The touch control system 200B is arranged to be able to regulate the luminous intensity of the light emitting element 100B by means of touching.

FIG. 14 of the drawings illustrated the touch control system 200B of the portable illumination device according to the above fourth preferred embodiment of the present invention. Referring to FIG. 14, the touch control system 200B comprises a control module 220B. The control module 220B is able to control the luminous intensity of the light emitting element 100B.

The control module 220B can control the luminous intensity of the light emitting element 100B according to a received control command that is sent from the electronic device W being touch controlled. Specifically, the touch control system 200B further comprises a connecting module 250B. The control module 220B can be operatively connected with the electronic device W through the connecting module 250B, such that when the electronic device W receives predetermined touching signal, the electronic device W will output and send corresponding control command to the control module 220B, so as to regulate and control the luminous intensity of the light emitting element 100B. According to the above fourth preferred embodiment of the present invention, the connecting module 250B comprises a wireless connecting module 251B and a wired connecting module 252B. The control module 220B of the touch control system 200B can be wirelessly connected with the electronic device W through the wireless connecting module 251B of the connecting module 250B. More specifically, through the wireless connecting module 251B, the signal command receiving module 221B of the control module 220B can utilize Bluetooth, wireless network (e.g. WiFi, 2G, 3G, 4G), and other connecting methods to be operatively connected with the electronic device W, such that the electronic device W can be utilized to transmit the signal command to the signal command receiving module 221B, so as to allow the luminous intensity of the portable illumination device to be regulated and controlled through operating the electronic device W.

Through the wired connecting module 252B, the signal command receiving module 221B of the control module 220B can utilize a connecting wire to connect with the electronic device W, such that the electronic device W can be utilized to transmit signal command to the signal command receiving module 221B, so as to allow the luminous intensity of the portable illumination device to be regulated and controlled through operating the electronic device W that is connected with the portable illumination device.

It is worth mentioning that, according to the above fourth preferred embodiment of the present invention, the connection between the electronic device and the portable illumination device through the connecting module 250B can transmit not only signal command, but also electricity, so as to provide charging function via the connecting module 250B.

The control module 220B controls the luminous intensity of the light emitting element 100B according to the signal command output and sent by the electronic device W. The control module 220B comprises a signal command receiving module 221B, a control unit 222B, and a control command sending module 223B. The signal command receiving module 221B receives the signal command output and sent by the electronic device W and transmits the signal command to the control unit 222B. The control unit 222B responds to the signal command to generate a corresponding control command. The control signal generated by the control unit 222B based on the signal command is output by the control command sending module 223B so as to regulate the luminous intensity of the light emitting element 100B.

Referring to FIG. 14, the touch control system 200B further comprises a driving module 230B. The driving module 230B is arranged to drive the light emitter diode, that is, the light emitting element 100B, so as to render the light emitting element 100B shine. The driving module 230B is electrically connected with the control module 220B, so that the control command sending module 223B of the control module 220B can output the control signal generated by the control unit 222B responding to the control command to the driving module 230B.

The driving module 230B amplifies the control signal after received it, so that the luminous intensity of the light emitting element 100B driven by the driving module 230B is regulated and controlled.

Referring to FIG. 14, the driving module 230B comprises a control command receiving module 231B and a driving unit 232B. The control command receiving module 231B and the control command sending module 223B of the control module 220B are electrically connected, such that the control command receiving module 231B can receive the control signal sent by the control command sending module 223B. The driving unit 232B and the light emitting element 100B are electrically connected. Then the driving unit 232B enlarges the control signal received by the control command receiving module 231B to control the luminous intensity of the light emitting element 100B.

The portable illumination device further comprises a power supply module 500B. Referring to FIG. 14, the power supply module 500B and the light emitting element 100B and the touch control system 200B are electrically connected, so as to provide electric power required by illumination of the light emitting element 100B. When the portable illumination device is in an on-state, the power supply module 500B and the light emitting element 100B and the touch control system 200B form a closed circuit, so that the light emitting element 100B can shine and illuminate and the light intensity of the illumination of the light emitting element 100B can be regulated and controlled by means of touching.

The portable illumination device further comprises a shell 300B. The shell 300B comprises a shell body 310B. The shell body 310B provides an accommodating space for accommodating the light emitting element 100B and the touch control system 200B. The shell 300B further comprises a light permeable element 330B. The light permeable element 330B is mounted on the shell body 310B. The mounting positions of the light permeable element 330B and the light emitting element 100B are adapted to each other, so that the light emitted from the light emitting element 100B can pass through the light permeable element 330B to provide an illuminated environment, as FIG. 15B illustrated. Referring to FIG. 15A, the portable illumination device further comprises a switch 400B. The switch 400B is mounted on the shell 300B. The switch 400B is arranged for controlling the cutting off and closing of the circuit formed with the touch control system 200B and the light emitting element 100B and the power supply module 500B. According to the above fourth preferred embodiment of the present invention, the switch 400B can be operated by being pressed down. It can be switched to cut off and close the circuit formed with the touch control system 200B and the light emitting element 100B and the power supply module 500B by one press operation.

What is different from previous preferred embodiment is that the signal command receiving module 221B obtains a signal command or a control command from an electronic device W and responds thereto, such that the luminous intensity of the portable illumination device is controlled by the electronic device W.

The shell 300B of the portable illumination device according to the above fourth preferred embodiment of the present invention is embodied as a flashlight housing which can also use conventional flashlight housing directly without structural change, so as to enhance the performance of conventional flashlight on the basis of energy saving and environmental protection.

Figure 17:
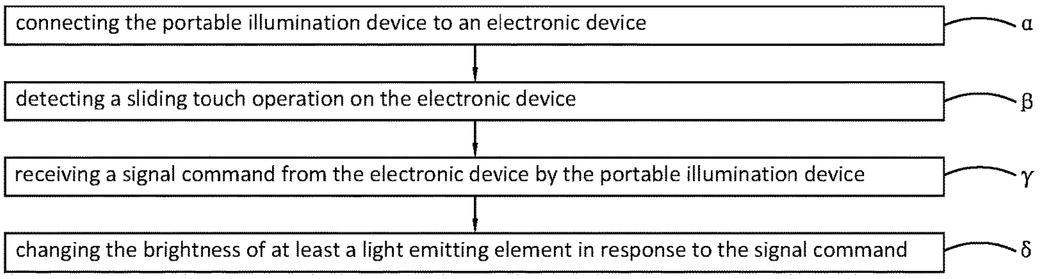
FIG. 17 illustrates a touch control method of portable illumination device according to the above fourth preferred embodiment of the present invention.

FIG. 17 of the drawings illustrated a touch control method of the portable illumination device according to the above fourth preferred embodiment of the present invention. The touch control method comprises the following steps:

(α) connecting the portable illumination device to an electronic device;

(β) detecting a sliding touch operation on the electronic device;

(γ) receiving a signal command from the electronic device by the portable illumination device;

(δ) changing the brightness of at least a light emitting element in response to the signal command.

According to the above fourth preferred embodiment of the present invention, the brightness of the light emitting element 100B is regulated and controlled in a circulating manner based on a predetermined order. That is to say, when the control module 220B received continual repeating commands, the brightness of the light emitting element 100B will change in a circulating manner according to corresponding predetermined order.

Those skilled in the art shall understand that the above-mentioned embodiments of the present invention in the descriptions and figures are to give examples, but to confine the present invention. Objectives of the present invention are completely and effectively implemented. Notions of the functions and structures of the present invention have been shown and described in the embodiments, whereas implementations of the present invention may have modifications or changes in any ways without going against the above notions.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A portable illumination device, comprising:

a light source having a plurality of brightness levels;

a touch control system, which is arranged for controlling an illumination of said light source, comprising a control system and a touch panel operatively connected to said control system, wherein said touch panel is configured for receiving a sliding touch operation, wherein said control system of said touch control system adjusts a current brightness level of said light source into an adjacent brightness level of said plurality of brightness levels in responsive to the sliding touch operation applied on said touch panel; and an indication component comprising a plurality of indicator lights for indicating said current brightness level of said light source, wherein a smaller number of said indicator lights are switched on when said current brightness level of said light source is shifted to a lower brightness level and a larger number of said indicator lights are switched on when said current brightness level of said light source is shifted to a higher brightness level.

2. The portable illumination device, as recited in claim 1, wherein said plurality of indicator lights is provided under said touch panel which has a light permeable area corresponding to said indicator lights.

3. A method of controlling illumination of a portable illumination device, wherein said portable illumination device comprises a light source having a plurality of brightness levels, wherein the method comprises the steps of:

(a) detecting a sliding touch operation on a touch panel;

(b) generating a control command corresponding to said sliding touch operation;

(c) adjusting a current brightness level of said light source into an adjacent brightness level of said plurality of brightness levels in response to said control command; and (d) indicating said current brightness level of said light source in such a manner that a smaller number of indicator lights are switched on when said current brightness level of said light source is shifted to a lower brightness level and a larger number of said indicator lights are switched on when said current brightness level of said light source is shifted to a higher brightness level.

4. The method, as recited in claim 3, wherein said indicator lights is provided under said touch panel which has a light permeable area corresponding to said indicator lights.

* * * * *